UNITED STATES PATENT OFFICE.

GEORGE PONTIN, OF SOUTHAMPTON, ENGLAND.

PRESERVING MIXTURE.

No. 833,696.

Specification of Letters Patent.

Patented Oct. 16, 1906.

Application filed January 5, 1904. Serial No. 187,800.

*To all whom it may concern:*

Be it known that I, GEORGE PONTIN, a subject of the King of Great Britain, residing at The Chalet, St. James Road, Shirley, Southampton, in the county of Hants, England, have invented a Preserving Mixture, of which the following is a specification.

This invention relates to means for preserving perishable articles or products—such as fruit, eggs, butter, and the like—with a view to the better carriage and storage thereof under varying climatic conditions in cold or tropical climates and to protect the same during transit in all parts of the world.

In effecting the object of my invention I employ a mixture or compound composed of the following ingredients in substantially the proportions given, the said ingredients being reduced to a fine powder or a finely divided or pulverized condition: asbestos and shale, fifty per cent.; lake flour or kieselguhr, forty per cent.; pumice-stone, five per cent.; charcoal, five per cent.; total, one hundred per cent. These ingredients in or about the said proportions having been thoroughly ground and mixed together, the mixture or compound is ready for being laid or deposited in the box or other receptacle in which the articles or products are to be packed. The said articles or products are completely inclosed in a thin wrapping or covering of asbestos, great care being exercised in applying this covering, so that the articles or products may be effectually protected from contact with the powdered mixture or compound. The articles thus protected are then placed in a suitable box or receptacle and a quantity of the aforesaid powder tightly pressed about the same until the receptacle is filled, the latter being ultimately secured by nailing, as in the case of any ordinary box or case or in any other convenient manner.

In treating some produce—such as butter, cheese, lard, &c.—it is necessary that the mixture or compound be pressed in very hard and tight, so that it shall form side walls or partitions to the boxes or linings for large storage-chambers or for chambers for the reception or storage of the produce while in course of transit on shipboard or otherwise.

The mixture or compound may, if desired, be used in a wet or plastic condition by adding water thereto, it being then applied as plastering or otherwise fixed to the walls, ceilings, or other surfaces where necessary in the proper carrying out of my invention.

The mixture when used in a wet or plastic condition should be in the proportions hereinbefore referred to; but if the mixture or compound be molded in the form of slabs or the like a small proportion of wood-ash may be found advantageous in facilitating the "forms" leaving the molds.

Lake flour or kieselguhr is a well-known substance in Germany and Victoria, where it is obtained from the beds of dry lakes.

What I claim, and desire to secure by Letters Patent of the United States, is—

1. The herein-described mixture or compound consisting of asbestos and shale, lake flour, pumice-stone and charcoal substantially as described and for the purposes specified.

2. The herein-described mixture or compound for preserving perishable articles or products consisting of asbestos and shale fifty per cent., lake flour forty per cent., pumice-stone five per cent. and charcoal five per cent., substantially as described.

3. The herein-described plastic mixture or compound for preserving perishable articles or products consisting of asbestos and shale fifty per cent., lake flour forty per cent., pumice-stone five per cent., charcoal five per cent. and water, substantially as described.

In testimony whereof I have hereunto set my hand, in presence of two subscribing witnesses, this 9th day of December, 1903.

GEORGE PONTIN.

Witnesses:
T. CILLY WALSH,
WALTER J. SKERTEN.